United States Patent Office 3,442,919
Patented May 6, 1969

3,442,919
17α - ALKA - 1',3' - DIYNYL - STEROIDAL-
4,9(10)-DIEN-3-ONES
Peter Feather and Vladimir Petrow, London, England,
assignors to The British Drug Houses Limited
No Drawing. Filed Mar. 6, 1967, Ser. No. 620,600
Claims priority, application Great Britain, Mar. 14, 1966,
11,039/66
Int. Cl. C07c 169/10, 167/14; A61k 17/00
U.S. Cl. 260—397.4                6 Claims

ABSTRACT OF THE DISCLOSURE

A new group of steroid compounds, in particular, 17α-alka - 1',3' - diynyl - 17β - hydroxy(alkoxy) - oestra-4,9(10)-dien-3-ones, are provided.

This invention is for improvements in or relating to organic compounds and has particular reference to oestra-4,9(10)-dien-3-ones containing an alka-1',3'-diynyl substituent at C₁₇.

Our copending applications Ser. Nos. 559,737, 576,866 provide inter alia 17α-alka-1',3'-diynyl-17β-hydroxy(17β-alkoxy)-derivatives of the 19-norandrostane, oestrane, 18-methyl-oestrane, 18-ethyl-oestrane, oestratriene, 18-methyl-oestratriene and 18-ethyl-oestratriene series having the partial formula

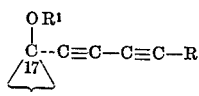

(I)

where R may be an alkyl group containing up to 5 carbon atoms and R¹ is H or R.

Our copending applications Ser. Nos. 559,737 and 576,866 provide processes for the preparation of 17α-alka-1',3'-diynyl - 17β - hydroxy(alkoxy) steroids which processes comprise, respectively, the direct alkylation of the corresponding butadiynyl steroid, and reacting the corresponding 17-oxo-steroid with a metallic derivative of an alka-1,3-diyne including the lithium, sodium, potassium or magnesium (mono-Grignard) derivatives, subsequently regenerating the desired derivative from the complex so-formed.

It is an object of the present invention to provide new 17α - alka - 1',3' - diynyl - oestra - 4,9(10) - dien - 3-ones having (apart from optional additional substituents in Rings A, B, C and D) the formula:

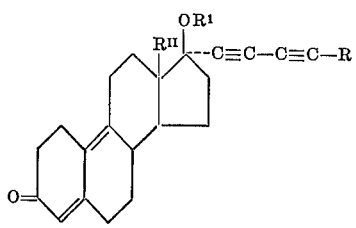

(II)

where R is an alkyl group containing up to 5 carbon atoms, R¹ is H or an alkyl group containing up to 5 carbon atoms, and R^II is Me or Et.

The new steroids of the present invention have valuable biological properties. They may possess, among others, potent progestational, ovulation inhibiting and claudogenic properties, which render the compounds of value in the control of fertility, both in the human and veterinary fields and in the treatment of a variety of gynaecological conditions and defects of the female reproductive system. The new steroids may be administered in standard pharmaceutical and veterinary forms, such for example as tablets, injections, vaginal sponges and tampons.

According to the present invention there is provided a process for the preparation of 17α-alka-1',3'-diynyl-17β-hydroxy/alkoxy-oestra-4,9(10)-dien-3-ones having (apart from optional additional substituents in Rings A, B, C and D) the formula

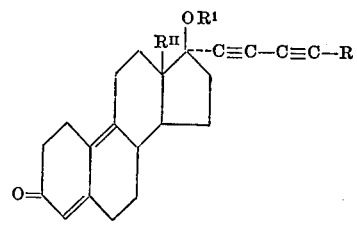

(II)

where R is an alkyl group containing up to 5 carbon atoms, R¹ is H or an alkyl group containing up to 5 carbon atoms, and R^II is Me or Et which process comprises reacting the corresponding 3-methoxyoestra-2,5(10)-diene having (apart from optional additional substituents in Rings A, B, C and D) the formula

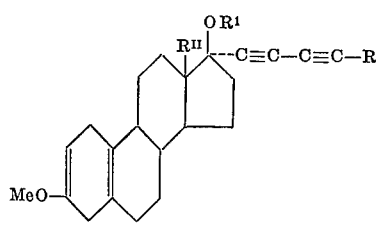

(III)

(where R, R¹ and R^II have the same meanings as above) with an organic acid, brominating the resulting oestra-5(10)-en-3-one having (apart from optional additional substituents in Rings A, B, C and D) the formula

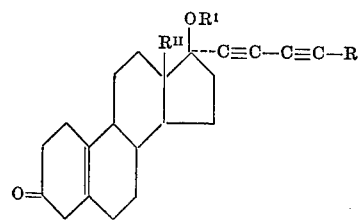

(IV)

(where R, R¹ and R^II have the same meanings as above), to give a dibromo-compound having (apart from optional additional substituents in Rings A, B, C and D) the formula

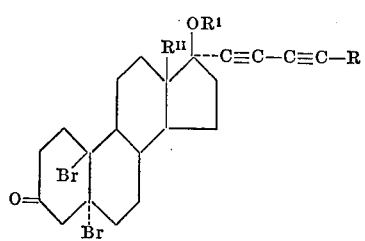

(V)

(where R, R¹ and R^II have the same meanings as above) and then eliminating two molecular proportions of hydrogen bromide to give the required oestra-4,9(10)-dien-3-one.

The bromination may be acheived by means of pyridinium bromide perbromide or other suitable brominating agent.

The elimination of hydrogen bromide may conveniently be achieved by treatment with an organic base such as pyridine.

Advantageously, the process of the invention may be carried out without isolation of the intermediate dibromocompound by reacting the oestr-5(10)-en-3-one in pyridine with approximately the theoretical quantity of pyridinium bromide perbromide.

The process of the invention may be carried out at temperatures approximately within the range −10 to +30° C., but it is preferred to begin the process at 0° C., subsequently allowing the temperature to rise to room temperature. The course of the reaction may, if desired, be followed by thin layer chromatography or examination of the UV spectrum of samples of the reaction mixture. The UV absorption of starting materials is relatively low, while the steroidal product absorbs strongly in the region of 303 mμ. It has been found that approximately 3 hours is sufficient for completion of the reaction. The steroidal product may be isolated by the usual methods of the art, for example by dilution with water which may, if desired, contain a reagent such as sodium thiosulphate to decompose any unreacted brominating agent, followed by extraction with a suitable solvent such as ether, dichloromethane or a mixture of such solvents. The steroidal product may be purified by the usual methods of the art, for example by chromatography and/or crystallisation from a suitable solvent.

The oestr-5(10)-en-3-ones are prepared by reacting the corresponding 17α-alka-1′,3′ - diynyl - 3 - methoxyestra-2,5(10)-diene (described in our copending application Ser. No. 576,866) with an organic acid, for example oxalic acid, in aqueous methanol.

It will be apparent to those skilled in the art that the process of the invention may be applied to steroids containing a variety of substituents in Rings A, B, C and D.

Hydroxy groups and in particular hydroxy groups at $C_{11}$ and $C_{16}$ do not interfere with the process of the invention.

Carbonyl groups at $C_{11}$ do not interfere with the process of the invention.

Alkyl groups containing up to 3 carbon atoms, and in particular methyl groups at $C_1$, $C_2$, $C_6$, $C_7$ and $C_{16}$ will not in general interfere with the process of the invention.

New steroids provided by the present invention may belong to the oestradiene, 18-methyl-oestradiene and 18-ethyl-oestradiene series, or stereoisomers thereof, and may optionally contain in addition to the 17α-alka-1′,3′-diynyl, 17β-hydroxy/alkoxy and 3-oxo-groups, hydroxy groups at $C_{11}$ and $C_{16}$, carbonyl groups at $C_{11}$, alkyl (including cycloalkyl) groups at $C_1$, $C_2$, $C_6$, $C_7$ or $C_{16}$, or combinations of two or more such groups.

Following is a description by way of example of methods of carrying the invention into effect.

EXAMPLE 1

17α-hexa-1′,3′-diynyl-oestr-5(10)-en-17β-ol-3-one

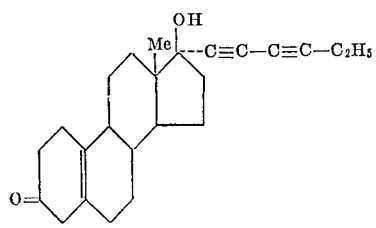

Oxalic acid (2.0 g.; anhydrous) in water (20 ml.) was added to 17α-hexa-1′,3′-diynyl-3-methoxy-oestra-2,5(10)-dien-17β-ol (1.0 g.) (see Example 34 of our copending application Ser. No. 576,866) in methanol (150 ml.) and the mixture was stirred at room temperature for 30 minutes. Ether was added and the ethereal layer was washed with aqueous sodium bicarbonate solution and with water, dried over sodium sulphate and freed from solvent at reduced pressure, affording a residue of 17α-hexa-1′,3′-diynyl-oestr-5(10)-en-17β-ol-3-one, $\lambda_{max.}^{EtOH}$ 244 mμ (ε, 143), 250 mμ (ε, 146), 256 mμ (ε, 145), 262 mμ (ε, 90); $\nu_{max.}^{CCl_4}$ 3596, 2240, 1725 cm.$^{-1}$ used in the next stage without further purification.

17α-hexa-1′,3′-diynyl-oestra-4,9(10)-dien-17β-ol-3-one

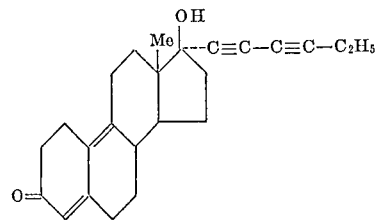

The foregoing compound (1 g.) in anhydrous pyridine (20 ml.) was treated at 0° C. with pyridinium bromide perbromide (0.96 g.), added in portions during 15–20 minutes, with stirring. The mixture was allowed to stand at 0° C. for 1 hour and at room temperature for 2 hours. Aqueous sodium thiosulphate solution (45 ml. 2%) was added and the resulting oily precipitate was extracted with a mixture of ether and dichloromethane (3:1). The organic layer was washed successively with aqueous hydrochloric acid, aqueous sodium hydroxide solution, water and saturated brine, dried over sodium sulphate and freed from solvent at reduced pressure. The residue was crystallised successively from ether/petroleum-ether, ether and aqueous methanol, affording 17α-hexa-1′,3′-diynyl-oestra-4,9(10)-dien-17β-ol-3-one, $\lambda_{max.}^{EtOH}$ 303 mμ (ε, 18,300); $\nu_{max.}^{CCl_4}$ 3600, 2225, 1668, 1610 cm.$^{-1}$; $\nu_{max.}^{CS_2}$ 1245, 1036 cm.$^{-1}$ M.P. 175° C., $[\alpha]_D^{26}$ −269° (c., 0.9 in dioxan).

The compound showed pronounced claudogenic and progestational activities when tested in rats and rabbits respectively.

In the rat oral claudogenic test a dose of 1 milligram per kilogram per day for 10 days led to no pregnancies giving 100% claudogenic activity.

In the rabbit progestational (Clauberg) assay the compound proved 1½ times more active than nor-ethisterone.

EXAMPLE 2

17α-penta-1′,3′-diynyl-oestr-5(10)-en-17β-ol-3-one

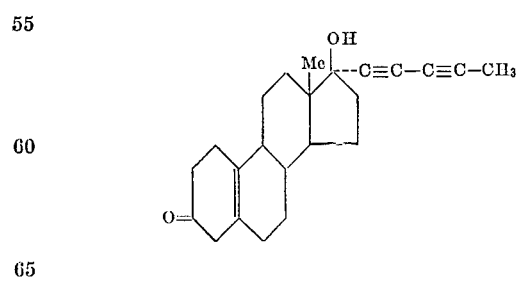

A solution of anhydrous oxalic acid (0.9 g.) in water (18 ml.) was added to 17α-penta-1′,3′-diynyl-3-methoxy-oestra-2,5(10)-dien-17β-ol (1.2 g.) (see Example 2 of our copending application Ser. No. 576,866) in methanol (180 ml.) and the mixture was stirred at room temperature for 1 hour. Ether (400 ml.) was added, the mixture was shaken with aqueous sodium bicarbonate solution and then with water, dried and stripped under reduced pressure. Purification by chromatography on neutral alumina, eluting with toluene, afforded 17α-penta-1′,3′-diynyl-oestr-5(10)-en-17β-ol-3-one, $\nu_{max.}^{CCl_4}$ 3600, 2245, 1722 cm.$^{-1}$ 17α-penta-1′,3′-diynyl-oestra-4,9(10)-dien-17β-ol-3-one

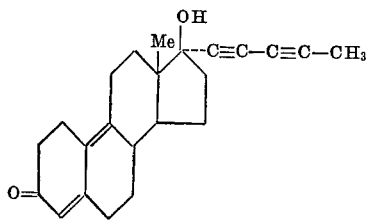

The foregoing compound was treated with pyridinium bromide perbromide by the method of Example 1 and afforded 17α-penta-1′,3′-diynyl-oestra-4,9(10)-dien-17β-ol-3-one, $\lambda_{max.}^{EtOH}$ 303 mμ (ε, 18,100); $\nu_{max.}^{CCl_4}$ 3605, 2235, 1669, 1610 cm.$^{-1}$

EXAMPLE 3

17α-n-hepta-1′,3′-diynyl-oestr-5(10)-en-17β-ol-3-one

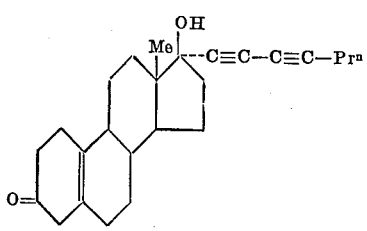

17α-n-hepta-1′,3′-diynyl-3-methoxy-oestra-2,5(10)-dien-17β-ol (see Example 36 of our copending application Ser. No. 576,866, was reacted with oxalic acid by the method of Example 1 and afforded 17α-n-hepta-1′,3′-diynyl-oestr-5(10)-en-17β-ol-3-one $\nu_{max.}^{CCl_4}$ 3600, 2245, 1727 cm.$^{-1}$ 17α-n-hepta-1′,3′-diynyl-oestra-4,9(10)-dien-17β-ol-3-one

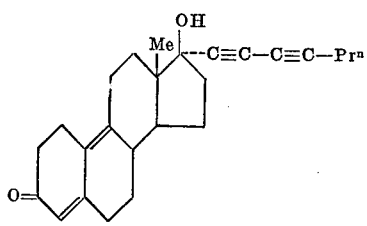

The foregoing compound was reacted with pyridinium bromide perbromide by the method of Example 1 and afforded 17α-n-hepta-1′,3′-diynyl-oestra - 4,9(10) - dien-17β-ol-3-one, $\lambda_{max.}^{EtOH}$ 303 mμ (ε, 18,400); $\nu_{max.}^{CCl_4}$ 3600, 2235, 1668, 1611 cm.$^{-1}$

EXAMPLE 4

17α-penta-1′,3′-diynyl-17β-methoxy-oestr-5(10)-en-3-one

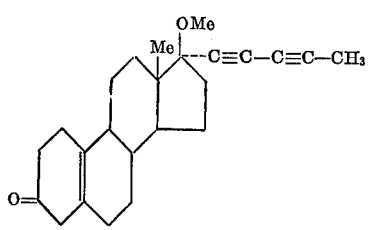

17α - penta - 1′,3′ - diynyl - 3,17β - dimethoxy - oestra-2,5(10)-diene (see Example 3 of our copending application Ser. No. 559,737) was reacted with oxalic acid by the method of Example 1 and afforded 17α-penta-1′,3′-diynyl-17β-methoxy-oestr-5(10)-en-3-one $\nu_{max.}^{CCl_4}$ 2245, 1724 cm.$^{-1}$ 17α-penta-1′,3′-diynyl-17β-methoxy-oestra-4,9(10)-dien-3-one

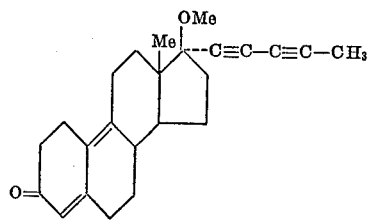

The foregoing compound was reacted with pyridinium bromide perbromide by the method of Example 1 and afforded 17α-penta-1′,3′-diynyl-17β-methoxy - oestra - 4,9(10)-dien-3-one, $\lambda_{max.}^{EtOH}$ 303 mμ (ε, 18,250); $\nu_{max.}^{CCl_4}$ 2235, 1670, 1612 cm.$^{-1}$

EXAMPLE 5

17α-hexa-1′,3′-diynyl-13β-ethyl-3-methoxy-gona-2,5(10)-dien-17β-ol

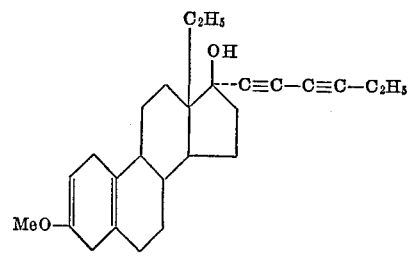

Hexa-1,3-diyne (5.0 g.) was added to sodamide (from 1.15 g. of sodium and a trace of ferric nitrate) in stirred, refluxing liquid ammonia (200 ml.) followed, after 5 minutes, by 13β - ethyl - 3-methoxygona-2,5(10)-dien-17-one (7.3 g.) (Herchel Smith et al., J. Chem. Soc., 1964, 4472) in anhydrous tetrahydrofuran (200 ml.) and the mixture was stirred under reflux for 2 hours. Solid ammonium chloride (3 g.) was added and the ammonia was allowed to evaporate. The steroidal product was recovered by extraction with ether and purified by crystallisation from methanol containing a drop of pyridine, affording 17α - hexa - 1′,3′ - diynyl-13β-ethyl-3-methoxy-gona-2,5(10)-dien-17β-ol, $\nu_{max.}^{CCl_4}$ 3600, 2240, 1696, 1668 cm.$^{-1}$ 17α-hexa-1′,3′-diynyl-13β-ethyl-gon-5(10)-en-17β-ol-3-one

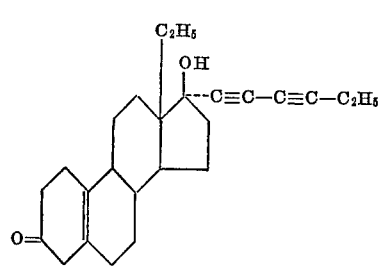

The foregoing compound was reacted with oxalic acid by the method of Example 1 and afforded 17α-hexa-1′,3′-diynyl-13β-ethyl-gon-5(10)-en-17β-ol-3-one, $\nu_{max.}^{CCl_4}$ 3605, 2245, 1726 cm.$^{-1}$ 17α-hexa-1′,3′-diynyl-13β-ethyl-gon-4,9(10)-dien-17β-ol-3-one

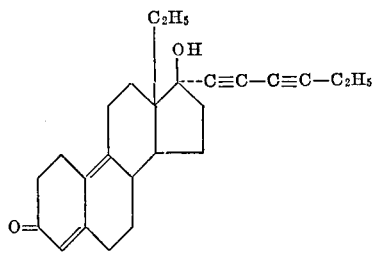

The foregoing compound was reacted with pyridinium bromide perbromide by the method of Example 1 and afforded 17α - hexa-1′,3′-diynyl-13β-ethyl-gona - 4,9(10)-dien-17β-ol-3-one, $\lambda_{max.}^{EtOH}$ 303 mμ (ε, 18,550); $\nu_{max.}^{CCl_4}$ 3610, 2240, 1667, 1609 cm.$^{-1}$

We claim:
1. 17α - alka - 1′,3′ - diynyl - oestra - 4,9(10) - dien - 13-ones having the formula

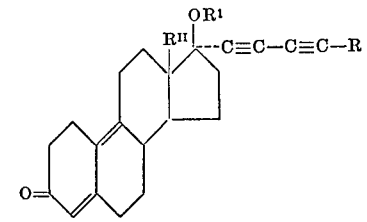

(II)

where R is an alkyl group containing up to 5 carbon atoms, R$^1$ is H or an alkyl group containing up to 5 carbon atoms, and R$^{II}$ is Me or Et.

2. A compound according to claim 1 consisting of 17α-hexa-1′,3′-diynyl-oestra-4,9(10)-dien-17β-ol-3-one.

3. A compound according to claim 1 consisting of 17α-penta-1′,3′-diynyl-oestra-4,9(10)-dien - 17β-ol-3-one.

4. A compound according to claim 1 consisting of 17α-n-hepta-1′,3′-diynyl-oestra-4,9(10) - dien - 17β-ol-3-one.

5. A compound according to claim 1 consisting of 17α-penta-1′,3′-diynyl-17β-methoxy-oestra-4,9(10) - dien - 3-one.

6. A compound according to claim 1 consisting of 17α-hexa-1′,3′-diynyl,13β-ethyl-gona-4,9(10) - dien - 17β-ol-3-one.

References Cited

UNITED STATES PATENTS

| | | | |
|---|---|---|---|
| 2,983,735 | 5/1961 | de Ruggieri et al. | 260—397.4 |
| 3,072,646 | 1/1963 | Fried et al. | 260—239.55 |
| 3,086,027 | 4/1963 | Perelman et al. | 260—397.3 |
| 3,164,617 | 1/1965 | Feather et al. | 260—397.4 |

ELBERT L. ROBERTS, Primary Examiner.

U.S. Cl. X.R.

260—999